United States Patent [19]

Tamura et al.

[11] 4,110,902
[45] Sep. 5, 1978

[54] METHOD FOR MANUFACTURING A MAGNETIC HEAD FOR VIDEO SIGNAL

[75] Inventors: Teizou Tamura; Katsuo Konishi, both of Yokohama, Japan

[73] Assignee: Hitachi, Ltd., Japan

[21] Appl. No.: 752,177

[22] Filed: Dec. 20, 1976

[30] Foreign Application Priority Data

Dec. 22, 1975 [JP] Japan .................. 50-151862
Jul. 14, 1976 [JP] Japan .................. 51-82996

[51] Int. Cl.² .............................................. G11B 5/42
[52] U.S. Cl. ................................. 29/603; 51/283 R; 51/328; 360/121; 360/122
[58] Field of Search ............... 29/603; 51/328, 283; 125/12, 21; 360/119, 121, 122

[56] References Cited

U.S. PATENT DOCUMENTS

| 3,478,732 | 11/1969 | Clark et al. .................. 125/12 |
| 3,508,534 | 4/1970 | Bonnefoy et al. ............. 125/21 |
| 3,845,550 | 11/1974 | Gooch et al. .................. 29/603 |
| 4,011,692 | 3/1977 | von der Kall et al. ....... 29/603 X |

Primary Examiner—Carl E. Hall
Attorney, Agent, or Firm—Craig & Antonelli

[57] ABSTRACT

A head chip having a track width of a gap smaller than a thickness of a core enables a high density recording of a video signal. The track width of the gap is machined before a bulk is sliced into individual head chips to save manufacturing time and enhance yield. An efficient machining of the track width is achieved using a plurality of hard metal wires such as piano wires spanned on rollers each having a plurality of precisely spaced grooves thereon and reciprocating the metal wires while dropping grinding liquid thereon. In this manner, the occurrence of chipping of core material is minimized or the size of chipping, if any, is minimized.

3 Claims, 30 Drawing Figures

METHOD FOR MANUFACTURING A MAGNETIC HEAD FOR VIDEO SIGNAL

BACKGROUND OF THE INVENTION

The present invention relates to a magnetic head for magnetically recording and/or reproducing a video signal, and a method for manufacturing the same. More particularly, the present invention relates to a magnetic head of a structure adapted for a high density recording and a method for manufacturing the same.

Figure 1:
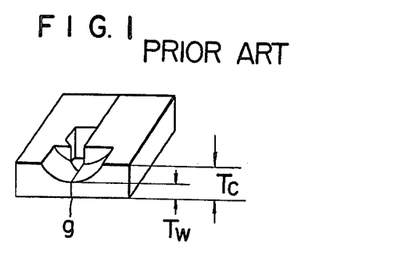
FIG. 1 is a perspective view showing a structure of a prior art magnetic head.

In an apparatus for magnetically recording and/or reproducing the video signal such as a video tape recorder (VTR), a high density recording is required to efficiently use a magnetic recording medium or a magnetic tape. For this purpose a very small head chip having a gap width (i.e. length of gap measured longitudinally of a record track) of less than 1 $\mu$m and a track width of less than 100 $\mu$m has been required. Moreover, these dimensions must be machined with a high precision. In this case, if the thickness of the head chip is reduced entirely to an extent comparative to the track width, a cross sectional area of the core is so reduced that the reluctance of the core increases resulting in the decrease of a reproducing efficiency of the head. In the past, for this reason, the head chip having such small gap width and track width has been designed to have a structure as shown in FIG. 1. Namely, the thickness of the head chip, that is, the thickness $Tc$ of the core has been selected to be three to four times as large as the track width $Tw$ to reduce the reluctance of the core. (The drawing schematically shows the shape but the relation of the respective dimensions is not exactly indicated.)

Figure 2A:
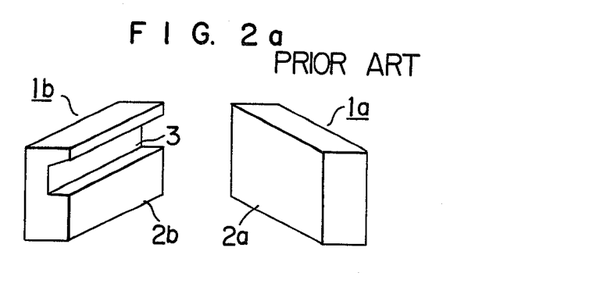
Figure 2B:
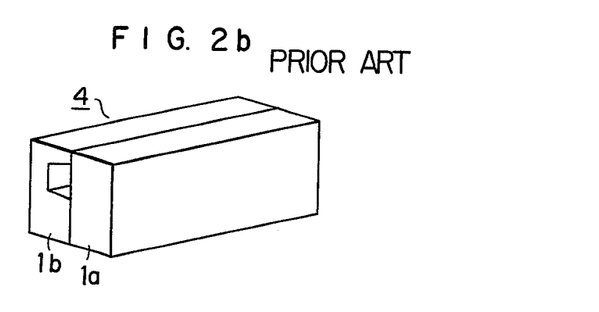

A method for manufacturing the head chip of FIG. 1 is now explained with reference to FIG. 2. A pair of elongated rectangular bodies $1a$ and $1b$ of magnetic material having approximately 2 mm by 8 mm in size and approximately 1 mm in size are prepared. The magnetic bodies may be made of Mn-Zn single crystal ferrite or high density ferrite. One major surface of each of the elongated rectangular magnetic bodies is polished to a surface smoothness in the order of 0.05 $\mu$m or less. As shown in FIG. 2a, a polished surface $2b$ of one magnetic body $1b$ is formed with a channel 3 which serves as a window in winding a coil. Then, $SiO_2$ or $Al_2O_3$ layers as gap defining layers are formed to the thickness of 0.4 $\mu$m, for example, on the polished surfaces $2a$ and $2b$ which are to subsequently form a head gap. This may be formed by an R.F. sputtering method or the like. The magnetic bodies $1a$ and $1b$ are abutted to each other with the gap defining layers facing to each other and bonded by fusing glass therebetween to form a bonded block 4 having a gap width of 0.8 $\mu$m as shown in FIG. $2b$.

Figure 2C:
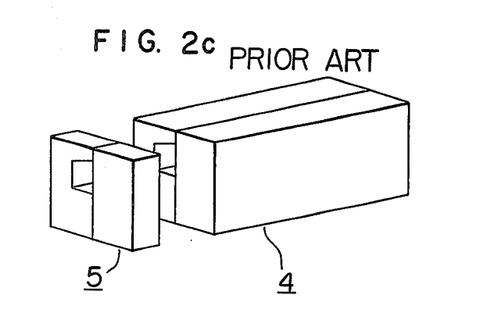
Figure 2D:
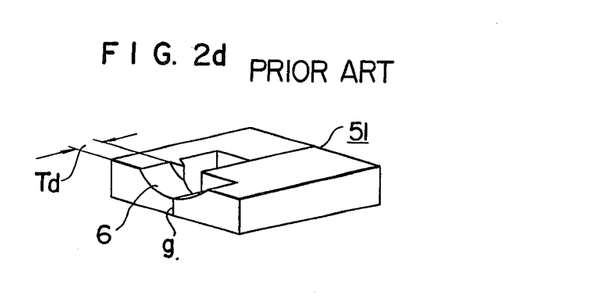

Then, as shown in FIG. $2c$, chips 5 each having a thickness of 250 $\mu$m, for example, are sliced from the bonded block 4. Finally, as shown in FIG. $2d$, an arcuate groove 6 is formed such that a predetermined track width $Tw$ (e.g. 60 $\pm$ 5 $\mu$m) is established near the gap $g$. The length $Td$ of the arcuate groove should be larger than the depth of the gap.

The arcuate groove 6 may be ground by a high speed grinding of in the order of 3,000 r.p.m. using a rod having a diameter of 1 mm, for example, on which diamond particles are attached. The grinding process may be observed through a microscope.

In the manufacturing method described above, if the center of the grinding rod is not exactly positioned at the gap, the track width changes even if the grinding depth is kept constant. Accordingly, the precision of the machining of the track width is low and a yield is less than 50% for the track width of 60 $\pm$ 5 $\mu$m, for example. Furthermore, because of the occurrence of crack or chipping at portions of the magnetic bodies during the machining process, the overall yield is further lowered. Moreover, since the machining process for establishing the track width $Tw$ must be carried out for each of the head chips 5, long manufacturing time is necessary, which eliminates a low cost head.

SUMMARY OF THE INVENTION

It is an object of the present invention to provide a magnetic head which can be easily manufactured yet has a high performance.

It is another object of the present invention to provide a magnetic head of a structure which insures a high yield and facilitates a high precision of machining.

It is still another object of the present invention to provide a novel method of manufacturing a magnetic head which insures shorter manufacturing time and a high precision of machining.

It is a further object of the present invention to provide a magnetic head for recording and/or reproducing a video signal which is suitable for mass production, and a method for manufacturing the same.

According to a feature of the present invention, machining of the track head is not carried out for individual head chips but carried out for a bulk body or block so that the track width machining for a number of head chips is accomplished in one step. This simultaneous machining of the track width for the head chips is carried out by grinding the block by a number of uniformly spaced hard wires while dropping grinding liquid thereon. Since the accuracy of the track width machining is determined by the accuracy of the pitch of the grinding hard wires, a high precision of machining is readily attained.

BRIEF DESCRIPTION OF THE DRAWINGS

FIGS. $2a$ to $2d$ are perspective views for illustrating a method for manufacturing the magnetic head structure shown in FIG. 1.

FIGS. $4a$ to $4d$ are perspective views for illustrating a method for manufacturing magnetic head shown in FIG. 3.

FIGS. $8a$ and $8b$ are perspective views showing one example of forming the bonded block from magnetic bodies of different sizes.

DESCRIPTION OF THE PREFERRED EMBODIMENTS

Figure 3:
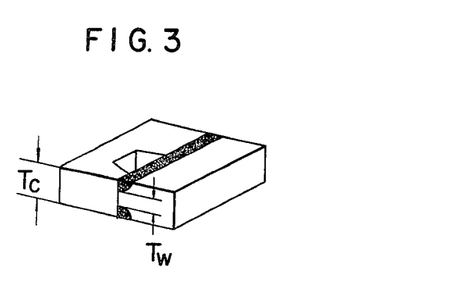
FIG. 3 is a perspective view showing one embodiment of a magnetic head in accordance with the present invention.

FIG. 3 shows one embodiment of a magnetic head in accordance with the present invention. One of the cores having the thickness Tc is formed with a window for a coil while the other core has arcuate notches at an area facing the one core to reduce the width of that area and glass is filled in the notches to define the track width Tw.

Figure 4A:
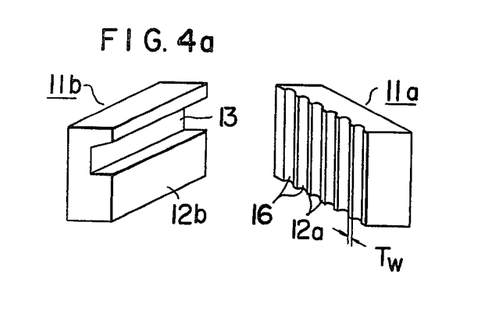
Figure 4B:
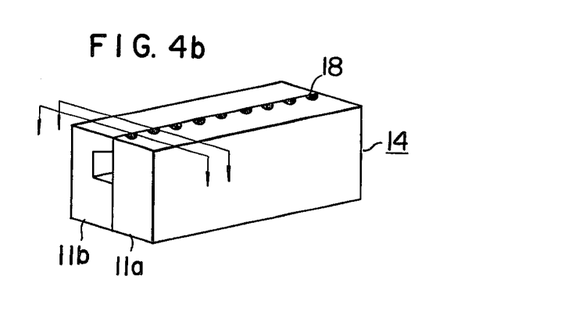
Figure 4C:
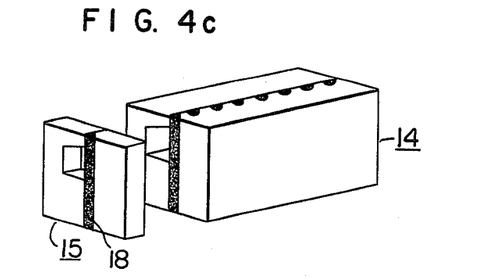
Figure 4D:
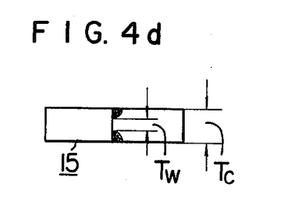

Referring to FIGS. 4a to 4d, an example for manufacturing the head structure shown in FIG. 3 is explained. A pair of elongated rectangular magnetic bodies made of Mn-Zn single crystal ferrite, for example, and each having its one surface polished are prepared. As shown in FIG. 4a, one magnetic body 11a is formed with a plurality of grooves 16 of semicircular section leaving flat areas 12a which define the track width. The other magnetic body 11b is formed with a channel 13 which defines the window for accommodating the coil. On the polished surfaces 12a and 12b of the magnetic bodies 11a and 11b, $SiO_2$ layers, for example, for defining the gap widh are formed as in the prior art head. The magnetic bodies 11a and 11b are then disposed to face to each other as shown in FIG. 4b and low melting point glass having a thermal expansion coefficient close to that of the ferrite is filled at corners of the window and in the semicircular grooves. The assembly is then fired in an inert gas atmosphere at 700°–800° C. to fuse the glass to form a bonded block 14. The block is then sliced along arrowed lines shown in FIG. 4b which intersect the glass-filled semicircular grooves to form individual head chips 15 as shown in FIG. 4c. In this manner a magnetic head having the track width Tw which is narrower than the head chip thickness Tc as shown in FIG. 4d is produced. The track width Tw of the head chip thus formed is defined by the flat areas 12a which were left unground when the semicircular groove were formed in the magnetic body in FIG. 4a. Thus, unlike the prior art method, the track width for a number of head chips are established in one process.

Figure 5:
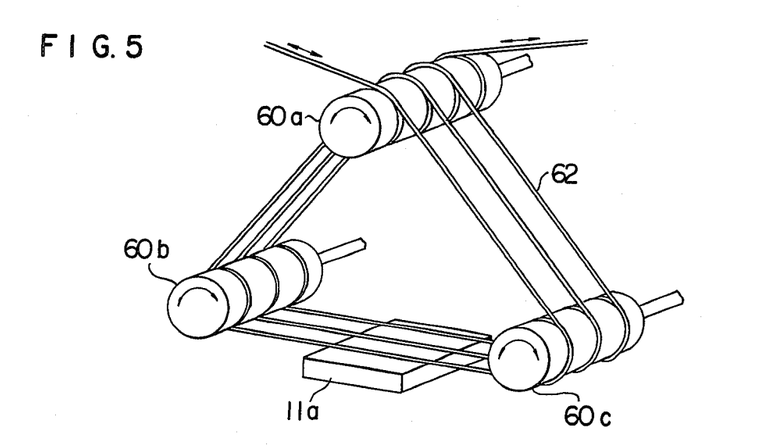
FIG. 5 is a schematic view of a grinding device used in the manufacture of the magnetic head of the present invention.
Figure 6:
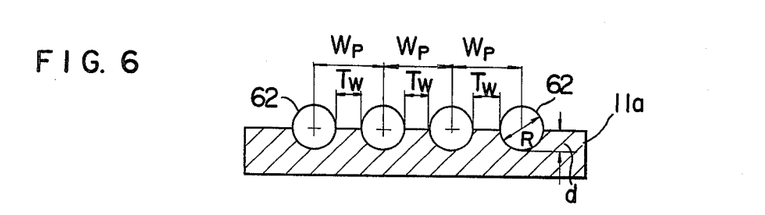
FIG. 6 is a sectional view showing a relation between a magnetic body and a hard wire of a wire saw in machining track width in the magnetic body.

The grinding of the semicircular grooves 16 in the magnetic body 11a for defining the track width is carried out by an apparatus which is schematically shown in FIG. 5. The apparatus is hereinafter referred to as a wire saw. The wire saw comprises hard wires 62 of circular cross section such as piano wires, stainless wires or tungsten wires which span over rollers 60a, 60b and 60c having precisely spaced grooves, and is arranged to reciprocate the hard wires 62 at a high speed. The magnetic body 11a to be machined is positioned to be in contact with those portions of the hard wires which span between the rollers 60b and 60c, and grinding liquid comprising mixture of SiC grindstone particles and light oil, for example, is dropped thereon in grinding the semicircular grooves. Any known method may be used to feed the grinding liquid to those portions of the hard wires which are used to grind the magnetic body. While a three-hard wire structure is shown for simplification, a number of hard wires such as 60 wires are actually arranged at an interval equal to the track width to be machined. FIG. 6 shows a partial sectional view of the magnetic body and the hard wires in the course of the grinding process. The pitch Wp of the hard wire for obtaining the desired track width Tw is determined from the relations of $Tw > Wp - R$ when $d < R/2$, and $Tw \leq Wp - R$ when $d \geq R/2$, where R is a diameter of the hard wire 62 and $d$ is a depth of the semicircular groove to be formed.

The end portions of the hard wire 62 which move past the roller 60a are wound by a supply reel and a takeup reel, not shown, so that new portions of the wires are gradually supplied while the wires are reciprocating at a high speed.

Figure 7:
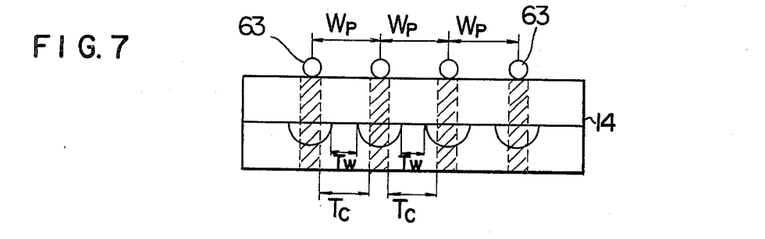
FIG. 7 is a side view showing a relation between the hard wire and a bonded block in cutting the block by the wire saw.
Figure 8A:
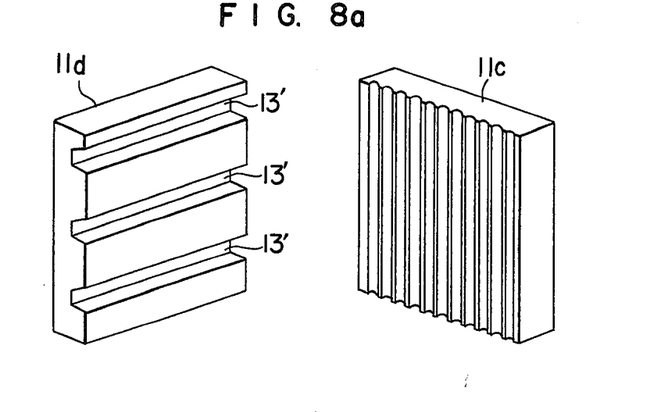
Figure 8B:
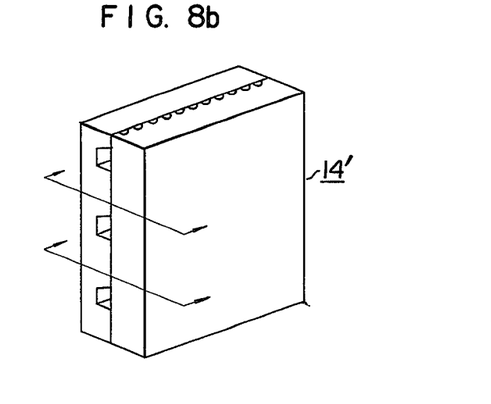

The slicing of the head chips 15 from the bonded block 14 shown in FIG. 4c may be carried out by using a diamond wheel having a cutting knife thickness thinner than the width of the groove 16 formed by the hard wire 62 to slice the individual head chips, or by using hard wires 63 each having a diameter smaller than the width of the groove 16 and arranged at the same pitch Wp as that of the hard wires used to form the track width and cutting the bonded block 14 using the same apparatus used in forming the track width, as shown in FIG. 7. The method of FIG. 7 enables the slicing of a number of head chips in one step and hence considerably saves the manufacturing time. Alternatively, as shown in FIG. 8a, a pair of magnetic bodies each having height of 8 mm, length of 16 mm and thickness of 1 mm, for example, are prepared, and three channels 13' for accommodating coils are formed in one magnetic body 11d. The body 11d is then faced to the other magnetic body 11c in which the track widths have been formed to form a bonded block 14' shown in FIG. 8b. The bonded block 14' is then cut along the arrowed lines shown in FIG. 8b into three sub-blocks. In this manner, approximately 180 head chips can be manufactured from the single bonded block 14 and the manufacturing time is saved by a factor of approximately 60 as compared with the manufacturing time required to make the same number of head chips by the prior art method.

According to the method of the present invention, since the track width is determined by the pitch of the hard wires a high accuracy of the size of the track width is readily attained to compare with the prior art method. Namely, when the depth of the arcuate groove which determines the track width is selected to be larger than the radius of the hard wire, the track width is determined only by the pitch of the hard wires. Accordingly, even when the depth of the groove to be ground increases the track width remains unchanged. Thus, a much higher precision of machining is attained as compared with a prior art method in which the track width varies with the depth of grinding.

Furthermore, an experiment showed that the size of chipping of the ferrite occurred during the machining in accordance with the present method was less than 3 $\mu$m and no crack occurred at all.

Figure 9:
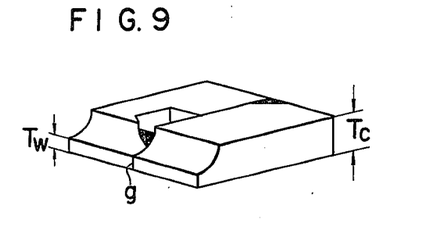
FIG. 9 is a perspective view showing other embodiment of the magnetic head of the present invention.

FIG. 9 shows another embodiment of the magnetic head of the present invention. In the previous embodiment the entire contact area between two cores had the track width Tw, whereas in the present embodiment the contact areas between two cores is narrowed only near the gap and that portion of the contact area which is opposite to the gap has the thickness Tc.

Figure 10A:
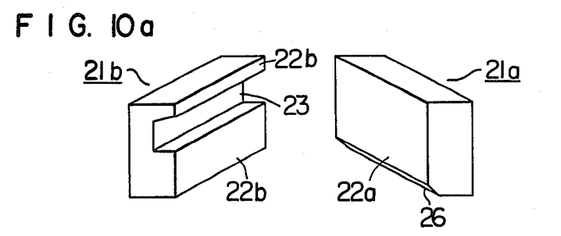
FIGS. 10a to 10f are perspective views for illustrating a method for manufacturing the magnetic head structure shown in FIG. 9.

A method for manufacturing the head structure shown in FIG. 9 is now explained with reference to FIGS. 10a to 10e. A pair of magnetic bodies are prepared in a similar manner to the previous embodiment, and one surface of each of the magnetic bodies are polished to a surface smoothness in the order of 0.05 μm or less. As shown in FIG. 10a, one magnetic body 21a is bevelled at lower edge 26 of the polished surface 22a to facilitate fusing of glass. At this step, unlike the previous embodiment, the track width machining is not carried out on the magnetic body 21a. The other magnetic body 21b is formed with a channel 23 for accommodating a coil in the polished surface 22b in exactly same manner as in the previous embodiment. Also, like in the previous embodiment, $SiO_2$ or $Al_2O_3$ layers for defining the gap width are formed on the polished surfaces 22a and 22b of the magnetic bodies 21a and 21b.

Figure 10B:
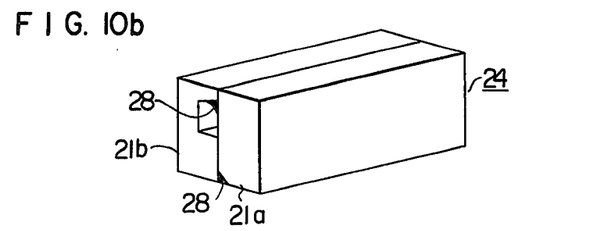

The two magnetic bodies 21a and 21b are then abutted to each other as shown in FIG. 10b and low melting point glass is filled at corners of the channel 23 for defining the coil window and on the bevelled surface 26. The assembly is then fired to fuse the glass to form a block 24 having the desired gap width. Numeral 28 denotes fused glass.

Figure 10C:
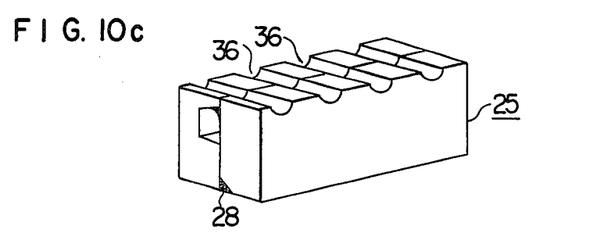
Figure 10F:
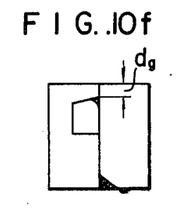
Figure 11A:
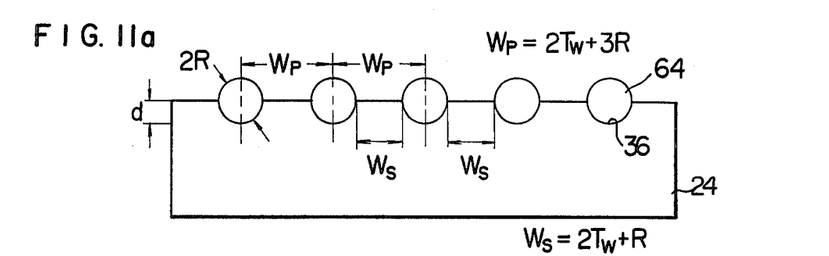
FIGS. 11a and 11b are side views showing one example of a method for slicing individual head chips from the block shown in FIG. 10b.

The block 24 is then machined to form the track width. The wire saw shown in FIG. 5 is used to form a plurality of arcuate grooves 36 on the upper surface of the block on which the gap has been formed, as shown in FIG. 10c. While only four grooves are shown in the drawing for simplification, several tens of grooves may be actually formed in one step. The pitch of the hard wires of the wire saw in forming the grooves 36 is selected to meet a relation illustrated in FIG. 11a, for example. Namely, the pitch of the hard wires 64 is selected to be equal to $2Tw + 3R$ where 2R is a diameter of the hard wire 64 and Tw is the desired track width. In this manner the grooves are formed in the surface of the block 24 perpendicularly thereto. While the depth d of the groove is shown in FIG. 11a to be equal to the radius of the hard wire 64, it may be larger than the radius of the hard wire if desired so that it is deeper than the gap depth dg shown in FIG. 10f. In this manner the block 25 having alternate arcuate grooves 36 having the width 2R and flat areas having width $2Tw + R$ is formed.

Figure 10D:
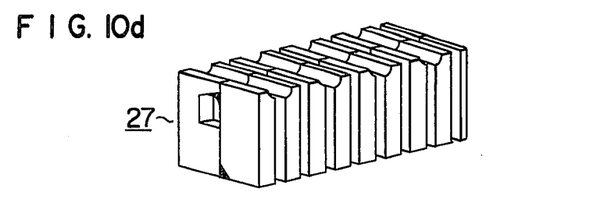
Figure 10E:
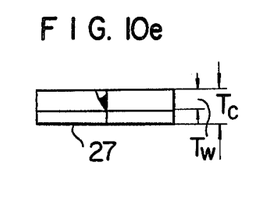
Figure 11B:
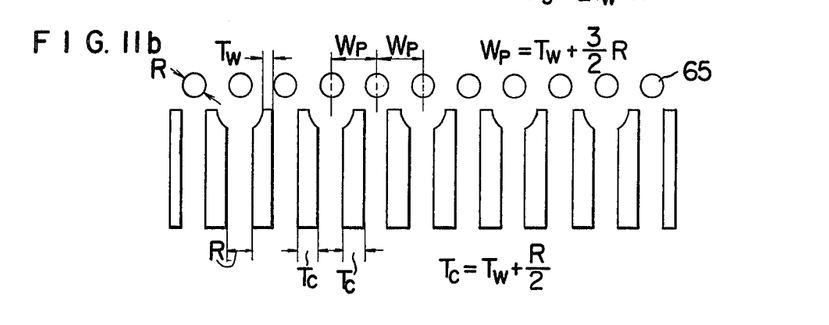

The block 25 is then sliced along center lines of the arcuate grooves and along center lines of the flat areas as shown in FIG. 10d to produce individual head chips 27. The slicing is carried out by the wire saw having the hard wires of the diameter equal to one half of that used to form the grooves and the wire pitch Wp which is equal to $Tw + (3/2)R$ with the centers of the respective hard wires 65 being aligned with the centers of the respective arcuate grooves 36. The cutting is continued until the individual head chips are sliced from the block 25. The head chips 27 thus sliced each has the thickness Tc which is equal to $Tw + (R/2)$ as shown in FIG. 10e and FIG. 11b having an arcuate notch in one side thereof while leaving the track width Tw at the tip end thereof.

Figure 12A:
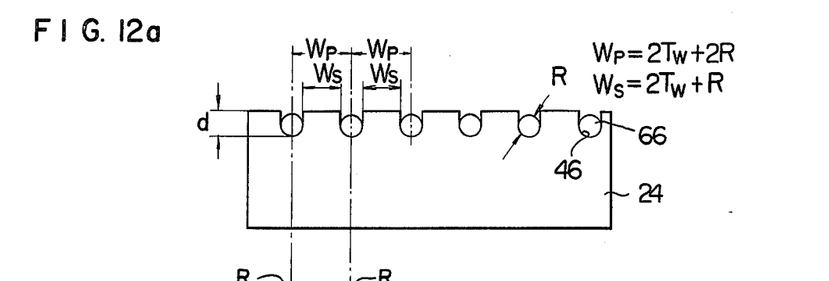
FIGS. 12a and 12b are side views showing other example of the method for slicing the individual head chips from the block shown in FIG. 10b.
Figure 12B:
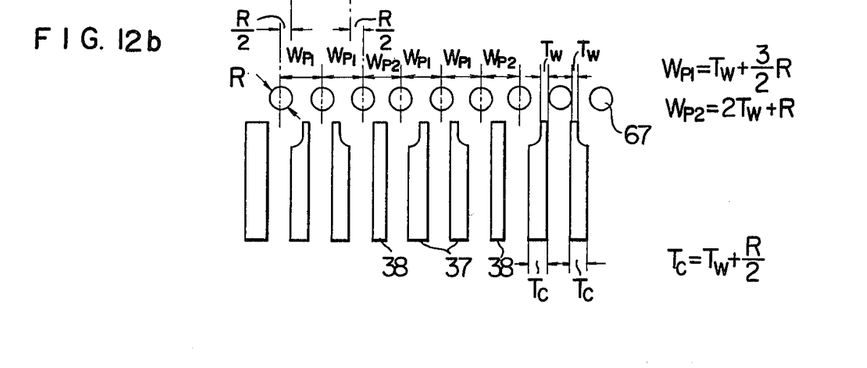

FIGS. 12a And 12b show an alternative method for slicing the head chips from the block 24 of FIG. 10b. In the present method, the hard wires used for slicing the head chips each has the same diameter as that of the respective wires used for forming the track width.

In FIG. 12a, the hard wires 66 each having the diameter R are arranged at the pitch Wp which is equal to $2Tw + 2R$ and the block is ground to a depth d which is deeper than the gap depth dg to form the grooves 46 while leaving the flat areas each having the width $W_s$ which is equal to $2Tw + R$. Then, the hard wires 67 each having the diameter R which is equal to that used to form the grooves 46 are arranged along the center lines of the respective flat areas and along the lines each displaced to the left or right from the respective center lines of the grooves 46 by a distance R/2, and the block is sliced. Namely, different pitch appears for every two wires such that a pitch sequence of $W_{p1}$, $W_{p1}$, $W_{p2}$, $W_{p1}$, $W_{p1}$, $W_{p2}$ . . . appears, where $W_{p1} = Tw + (3/2)R$ and $W_{p2} = 2Tw + R$. In this manner the head chips 37 each has the track width Tw and the thickness Tc which is equal to $Tw + (R/2)$, which has a substantially equal shape to that of the head chip 27 manufactured in the previous embodiment, are formed. In the present method, common hard wires of the wire saw may be used for forming the grooves and slicing the block but waste parts 38 of the block 24 result.

Figure 13A:
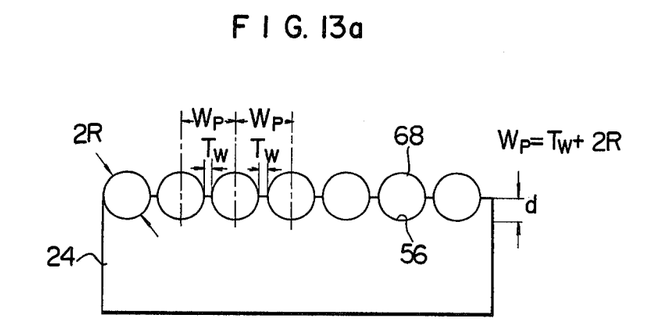
FIGS. 13a and 13b are side views showing a further example of the method of slicing individual head chips from the block shown in FIG. 10b
Figure 13B:
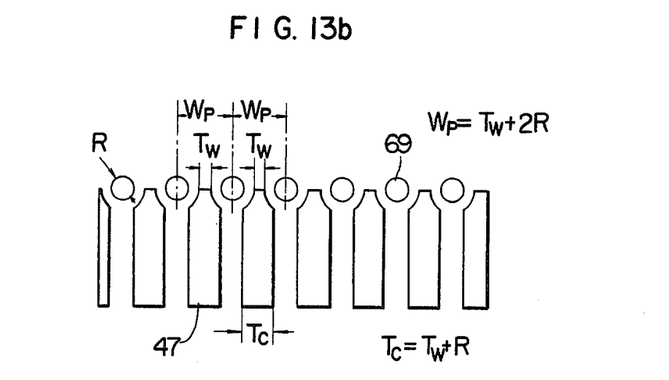

FIGS. 13a and 13b illustrate a further method for slicing the head chips from the block 24 shown in FIG. 10b. In the present metho, as shown in FIG. 13a, the hard wires 68 each having the diameter 2R are arranged at the pitch equal to $Tw + 2R$ to form the wire saw, which is used to form the arcuate grooves 56 in the block 24. The depth d of the groove 56 is selected to be deeper than the gap depth dg as in the previous cases. After the arcuate grooves 56 have been formed, the flat areas each having the track width Tw are left on the surface of the block 24.

Figure 13C:
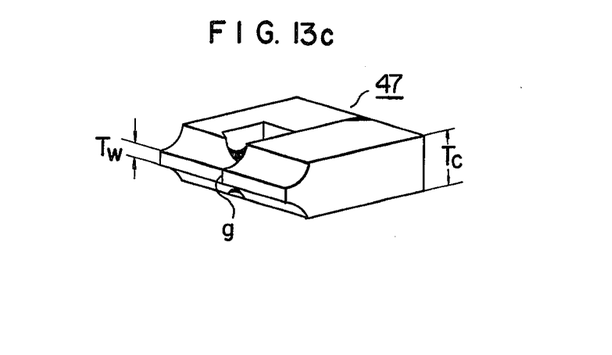
FIG. 13c is a perspective view showing a structure of the head chip thus sliced.

Then, as shown in FIG. 13b, the hard wires 69 each having smaller diameter, e.g. equal to R, than that of the hard wire 68 used in forming the grooves 56 are arranged at the same pitch as that of the hard wires 68 with each of the hard wires 69 aligning with respective center lines of the grooves 56. The block is then sliced using this wire saw. In this manner the head chips 47 each having arcuate notches on both sides thereof as shown in FIG. 13c are formed. According to the present method, since the machining of the track width Tw is carried out first as seen from FIG. 13a, a higher precision of track width machining is attained than in the two previous methods.

According to the head chips shown in FIGS. 9 to 13, since the width of the area which contacts with a recording medium such as a magnetic tape is defined by the track width only, the adjustment of contact with the recording medium is facilitated to compare with a head chip having a wider tip width. Furthermore, since sectional area is relatively large except at the gap and junction area of two cores is also large, a small reluctance is obtained, which in turn enhances reproducing efficiency.

As described hereinabove, according to the present invention, since the track widths are machined by the wire saw having a number of hard wires, a high precision of machining is attained, chipping of material during machining is minimized and a number of head chips are formed simultaneously. Furthermore, by merely changing the diameter or pitch of the hard wires of the wire saw, the track width or the shape of the head chip can be modified. Accordingly, high performance head chips having uniform characteristic can be manufactured with a high yield and a low cost. In this manner, the structure of the magnetic head and the method for manufacturing the same, which are suited for mass production, are provided.

What is claimed is:

1. A method of manufacturing magnetic head chips suited for recording and reproducing a video signal, by joining two cores together with an interleaved non-magnetic material layer for defining a gap width, comprising the steps of:
preparing a magnetic body having one plane thereof polished,
forming a trapezoidal channel for defining a window for accommodating a coil in said polished plane of said magnetic core,
preparing a second magnetic body having one plane thereof polished,
abutting said two magnetic bodies to each other with the polished planes thereof facing to each other, and bonding said two magnetic bodies together with a non-magnetic material layer interleaved therebetween to establish the desired gap width, for forming a bonded block,
arranging a plurality of metal wires each having circular cross section parallel with each other at a given pitch,
grinding that surface of said bonded block which corresponds to a plane to be faced to a recording medium by sliding said metal wires longitudinally on said surface while dropping grinding liquid thereon to form a plurality of grooves each having an arcuate cross section extending in a direction which traverses said gap, and
slicing said block along center lines of said grooves to form a plurality of head chips,
said slicing step comprising the sub-steps of arranging metal wires, each having a smaller diameter than that of the wires used to form said grooves, at the same pitch as that of the wires used to form said grooves, arranging additional metal wires, one for each intermediate position of two adjacent wires, and sliding the metal wires thus arranged longitudinally thereof on said block while dropping grinding liquid thereon to slice said block along center lines of the respective arcuate grooves and along intermediate lines between two adjacent grooves.

2. A method of manufacturing magnetic head chips suited for recording and reproducing a video signal, by joining two cores together with an interleaved non-magnetic material layer for defining a gap width, comprising the steps of:
preparing a magnetic body having one plane thereof polished,
forming a trapezoidal channel for defining a window for accommodating a coil in said polished plane of said magnetic core,
preparing a second magnetic body having one plane thereof polished,
abutting said two magnetic bodies to each other with the polished planes thereof facing to each other, and bonding said two magnetic bodies together with a non-magnetic material layer interleaved therebetween to establish the desired gap width, for forming a bonded block,
arranging a plurality of metal wires each having circular cross section parallel with each other at a given pitch,
grinding that surface of said bonded block which corresponds to a plane to be faced to a recording medium by sliding said metal wires longitudinally on said surface while dropping grinding liquid thereon to form a plurality of grooves each having an arcuate cross section extending in a direction which traverses said gap, and
slicing said block along center lines of said grooves to form a plurality of head chips,
wherein said slicing step comprising the sub-steps of arranging the metal wires used in forming the grooves with each pair of adjoining metal wires being displaced outwardly to each other by a distance equal to a radius of the metal wire, arranging additional metal wires at the centers of the respective wire pairs, and slicing said block by the metal wires thus arranged.

3. A method of manufacturing magnetic head chips suited for recording and reproducing a video signal, by joining two cores together with an interleaved non-magnetic material layer for defining a gap width, comprising the steps of:
preparing a magnetic body having one plane thereof polished,
forming a trapezoidal channel for defining a window for accommodating a coil in said polished plane of said magnetic core,
preparing a second magnetic body having one plane thereof polished,
abutting said two magnetic bodies to each other with the polished planes thereof facing to each other, and bonding said two magnetic bodies together with a non-magnetic material layer interleaved therebetween to establish the desired gap width, for forming a bonded block,
arranging a plurality of metal wires each having circular cross section parallel with each other at a given pitch,
grinding that surface of said bonded block which corresponds to a plane to be faced to a recording medium by sliding said metal wires longitudinally on said surface while dropping grinding liquid thereon to form a plurality of grooves each having an arcuate cross section extending in a direction which traverses said gap, and slicing said block along center lines of said grooves to form a plurality of head chips,
wherein the metal wires used to form the grooves are arranged at the pitch to establish a wire-to-wire separation equal to the desired track width, and
wherein said slicing step comprises the sub-steps of arranging metal wires, each having a diameter smaller than that of the metal wires used in forming grooves, at the same pitch as that of the metal wires used in forming the grooves, and sliding the metal wires thus arranged longitudinally thereof on said block while dropping grinding liquid thereon to slice said block along center lines of the respective arcuate grooves.

* * * * *